United States Patent [19]
Protz, Jr.

[11] Patent Number: 5,613,656
[45] Date of Patent: Mar. 25, 1997

[54] HANGER

[75] Inventor: William F. Protz, Jr., Lake Forest, Ill.

[73] Assignee: Santa's Best, Northfield, Ill.

[21] Appl. No.: 386,077

[22] Filed: Feb. 9, 1995

[51] Int. Cl.⁶ .................................................. F16L 3/08
[52] U.S. Cl. ...................... 248/74.2; 24/115 F; 248/316.7; 248/900
[58] Field of Search ............................ 248/61, 62, 74.1, 248/74.2, 231.81, 317, 340, 214, 316.7, 900, 548; 24/115 F, 602

[56] References Cited

U.S. PATENT DOCUMENTS

| | | | |
|---|---|---|---|
| 3,136,515 | 6/1964 | Potruch | 248/62 |
| 3,484,070 | 12/1969 | Horodko et al. | 248/317 |
| 3,521,332 | 7/1970 | Kramer | 248/74.2 X |
| 3,530,545 | 9/1970 | Lengyel | 248/317 X |
| 3,878,590 | 4/1975 | Bolger | 248/61 X |
| 5,383,638 | 1/1995 | Dieringer et al. | 248/317 |
| 5,423,501 | 6/1995 | Yu | 248/62 X |

*Primary Examiner*—Derek J. Berger
*Attorney, Agent, or Firm*—Emrich & Dithmar

[57] ABSTRACT

A hanger for positioning an object such as electrical wire or an ornament in remote locations such as in trees. The hanger has a first loop shaped portion for releasably mounting the hanger on a support at a remote location. The first loop shaped portion is a synthetic organic resin having a memory such that after deformation thereof the first portion returns substantially to its original shape. A second loop shaped portion is integral with the first portion for holding an object such as a wire or an ornament; however, the second loop shaped portion is stiffer than the first loop shaped portion such that a pulling force applied to the object or to the second portion results in said first portion deforming and releasing the support while the second portion still holds the object. The first and second portions each form loops open at one end to facilitate positioning the first portion on the support and an ornament or wire in the second portion.

18 Claims, 1 Drawing Sheet

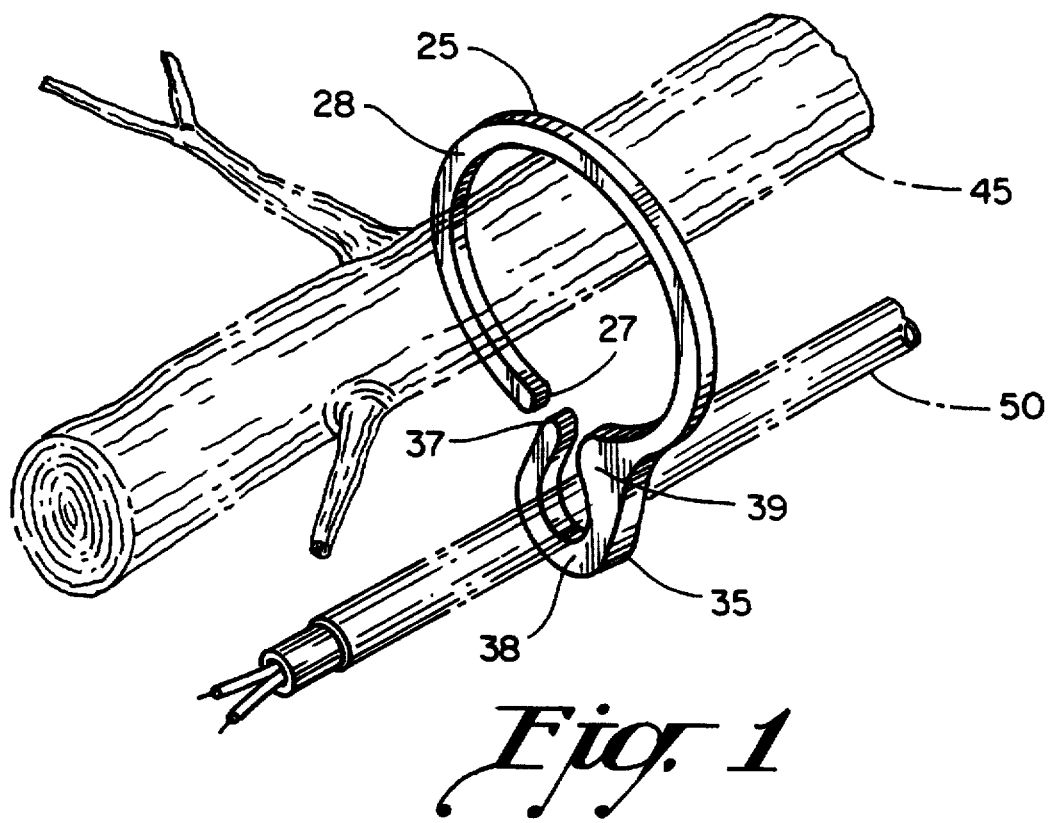
*Fig. 1*
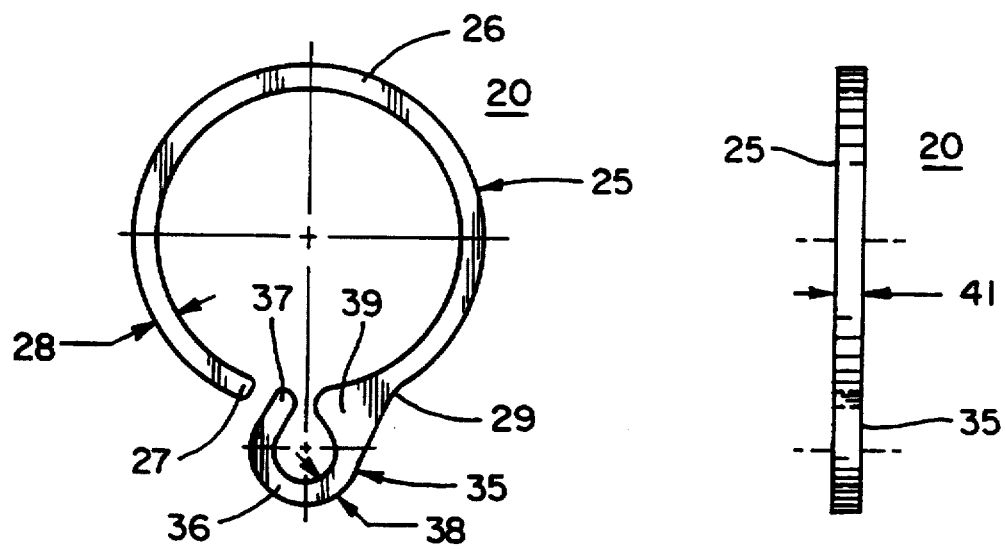
*Fig. 2*  *Fig. 3*

5,613,656

HANGER

BACKGROUND OF THE INVENTION

This invention relates to hangers useful for hanging wires such as wire sets traditionally used in stringing christmas lights out-of-doors and also are useful for hanging ornaments indoors or out-of-doors. The invention has particular use in hanging an object out-of-doors where the object which is held by a portion of the hanger is at a high elevation, requiring a device that is easily releasable by pulling action and yet preferably does not dislodge the item or object which the hanger supports when the hanger is removed from the elevated location.

Accordingly, the invention has most applicability for mounting ornaments or wires or the like at elevated locations so that the hanger can be pulled from the elevated location, still retaining the wire or ornament in a portion of the hanger. Thereafter, the hanger preferrably unit return to its original shape so that it may be reused the next holiday season.

SUMMARY OF THE INVENTION

It is an object of the invention to provide a hanger for positioning objects in a remote location in a manner in which the hanger is easily removable from the remote location and is thereafter reusable.

In another object of the invention is to provide a hanger for supporting objects at remote locations which are elevated such as in trees or the like wherein the hanger is easily removable from the elevated location by pulling on the hanger causing deformation of a portion thereof which portion returns to its original configuration permitting successive uses of the hanger.

Still another object of the invention is to provide a hanger of the type set forth in which the hanger is in two open ended loop shaped portions one of which is stiffer than the other so that when the hanger is removed from a remote location the objection which is supported in the stiffer portion stays in place while the hanger is dislodged from its remote position and usually elevated location.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1, is perspective view of the hanger of the present invention shown on a support such as a tree limb or the like with an object such as a wire located therein;

FIG. 2, is a side elevational view of the hanger illustrated in FIG. 1; and

FIG. 3, is aNend elevational view of the hanger illustrated in FIG. 2.

DETAILED DESCRIPTION OF THE PREFERRED EMBODIMENT

Referring now to the drawings there is illustrated a hanger 20 which is formed of a first loop shaped portion 25 and a second loop shaped portion 35 preferably integrally connected one with the other and in practicality formed as a single molded part. The first loop shaped portion 25 is part circular, as seen in FIG. 2, and has a free end 27. The first loop shaped portion 25 is generally provided with a constant radial dimension 28 throughout the circumferential extent of the first portion 25 which terminates at an end 29, as illustrated, spaced from the free end 22.

The second loop shaped portion 35 has a part circular portion 36 as illustrated in FIGS. 1 and 2 and has a free end 37. The second loop shaped portion 35 has a generally uniform radial dimension 38 throughout the circumferential extent of the second loop shaped portion 35 which terminates at free end 37 and a larger mass portion part 39 which interconnects the second loop shaped portion 35 with the end 29 of the first loop shaped portion 25.

Both the first loop shaped portion 25 and the second loop shaped portion 35 have substantially a uniform thickness as illustrated best in FIG. 3. The radial dimension 38 is greater than the radial dimension 28, preferably by a factor up to about 25% in order to provide greater stiffness to the second loop shaped portion 35 than the first loop shaped portion 25, for a purpose hereinafter described. Moreover, the larger mass part 39 also provides increased stiffness to the second portion 35 and also serves to trap an object such as a wire 50 or ornament (not shown) in the second portion 35 when it is mounted on a support such as tree limb 45 in an elevated location.

The fundamental purpose of the invention herein described, that is the hanger 20, is to enable the string sets of the usual type used at christmas or ornaments or other decorations of any nature whatsoever to be hung at a remote location, usually at an elevated location. Thereafter, when it is time to remove the ornaments or string sets it is easy to pull the hanger 20 from its support 45 by pulling on the ornament or wire 50 or in any manner creating a pulling force on the second portion 35 which causes the first portion 25 to physically deform and to release from the support 45. When the first portion 25 releases, it is an important aspect of the invention that it return substantially to its original shape as illustrated in the drawings so that it may be used again, while the item which has been supported by the second portion 35 remains substantially in place in the loop formed by the part circular portion 36.

In order to facilitate this feature, the hanger 20 is preferably integrally formed in a mold, but not necessarily, and is preferably made out of a synthetic organic resin which has a memory. Synthetic organic resins which are acceptable for use in the ornament 20 are polycarbonate, polyvinyl chlorides, nylons or various mixtures thereof. The particular resin used must be sufficient to withstand the weight of the items supported in the second portion 35 and provide the prerequisite memory so that the first portion 25 upon distortion when released from the support 45 can return to substantially its original configuration or shape.

One aspect of the hanger 20 which provides greater stiffness to the second portion 35 than to the first portion 25 is the location of the free end 27 from the adjacent terminal portion 29 of the first portion 25 and the distance between the free end 37 and the adjacent portion 39 from the second portion 35. The distance between the free end 27 and its adjacent end portion 29 is greater than the distance between the free end 37 and its adjacent portion 39. This particular configuration adds greater stiffness to the second portion 35 than to the first portion 25. Moreover, the radial dimension of the second portion 35 is greater than the radial dimension 28 of the first portion 25. This increase in radial dimension 38 of the second portion 35 also is a factor in increasing the relative stiffness of the second portion 35 with respect to the first portion 25 and is an important feature of the invention.

An obvious alternative to the increased radial dimension 38 for the second portion 35 is to make the second portion 35 thicker than the first portion 25 but the preferred embodiment of the invention 20 is as described it is unnecessary.

While there has been disclosed what is considered to be the preferred embodiment of the present invention, it is understood that various changes in the details may be made without departing from the spirit, or sacrificing any of the advantages of the present invention.

I claim:

1. A hanger for positioning an object such as electrical wire or an ornament in remote locations such as in trees, said hanger comprising:

a first portion for releasably mounting said hanger on a support at a remote location, a second portion connected to said first portion for holding an object such as a wire or ornament, said first and second portions are part circular in side elevation integral one with the other selected from a synthetic organic resin having a memory with the redial dimension of said second portion exceeding the radial dimension of said first portion.

2. The hanger of claim 1, wherein said first portion is loop shaped.

3. The hanger of claim 1, wherein said second portion is loop shaped.

4. The hanger of claim 1, wherein said first portion deforms to release and is a synthetic organic resin having a memory such that after deformation thereof, said first portion returns substantially to its original shape.

5. The hanger of claim 1, wherein said first and second portions are integral and said second portion has a part thereof having a larger mass than the remainder of said second portion, thereby imparting greater stiffness to said second portion than the first portion.

6. The hanger of claim 5, wherein said first and second portions are made from polycarbonate or polyvinyl chloride or nylon thereof.

7. The hanger of claim 1, wherein the first and second portions have substantially the same thickness.

8. The hanger of claim 1, wherein the radial dimension of said second portion is about 25% greater than the radial dimension of said first portion.

9. A hanger for positioning objects such as electric wire in remote locations such as trees, said hanger comprising:

a first loop shaped portion for releasably mounting said hanger on a support at a remote location, said first loop shaped portion having a first radial dimension, a second loop shaped portion integral with said first loop portion for holding an object such as a wire, said second loop shaped portion having a radial dimension larger than the radial dimension of said large arcuate first portion to provide greater stiffness to said second loop portion such that pulling force applied to the object or to said second portion results in said first loop portion releasing from the support while said second loop portion holds the object.

10. The hanger of claim 9, wherein said first and second portions are part circular in side elevation.

11. The hanger of claim 9, wherein said first and second portions are loop shaped with open ends, the distance between the open end of said first loop and the adjacent first loop being greater than the distance between the open end of said second loop and the adjacent second loop.

12. The hanger of claim 11, wherein said first and second portions are a synthetic organic resin having a memory such that after said first loop shaped portion is released from a support said first portion returns substantially to its original shape.

13. The hanger of claim 9, wherein the radial dimension of said second portion is about 25% greater than the radial dimension of said first portion.

14. The hanger of claim 9, wherein a portion of said second loop shaped portion is formed by a part thereof having a larger mass than the remainder of said second loop shaped portion, thereby imparting stiffness thereto.

15. A hanger for positioning an object such as electrical wire or an ornament in remote locations such as in trees, said hanger comprising:

a first loop shaped portion for releasably mounting said hanger on a support at a remote location;

said first loop shaped portion being a synthetic organic resin having a memory such that after deformation thereof said first portion returns substantially to its original shape;

a second loop shaped portion integral with said first portion for holding an object such as a wire or an ornament;

said first and second loop shaped portions have radial dimensions, the radial dimension of said second portion exceeding the radial dimension of said first portion by an amount up to about 25%;

said second loop shaped portion being stiffer than said first loop shaped portion such that a pulling force applied to the object or to said second portion results in said first portion deforming and releasing from the support while said second portion holds the object;

said first and second portions each forming loops open at one end to facilitate positioning said first portion on the support and an ornament or wire in said second portion.

16. The hanger of claim 15, wherein the synthetic organic resin is a polycarbonate or polyvinyl chloride or a nylon or thereof.

17. The hanger of claim 15, wherein the distance between the open end of said first loop and the adjacent first loop exceeding the distance between the open end of said second loop and the adjacent second loop.

18. The hanger of claim 17, wherein a part of said second loop shaped portion is larger in mass than the remainder of said second loop shaped portion.

* * * * *

UNITED STATES PATENT AND TRADEMARK OFFICE
CERTIFICATE OF CORRECTION

PATENT NO.  : 5,613,656
DATED       : March 25, 1997
INVENTOR(S) : William F. Protz, Jr.

It is certified that error appears in the above-indentified patent and that said Letters Patent is hereby corrected as shown below:

Claim 16, line 2, delete "or", third occurrence.

Signed and Sealed this

Twenty-second Day of July, 1997

Attest:

BRUCE LEHMAN

*Attesting Officer*  *Commissioner of Patents and Trademarks*